US009485151B2

(12) United States Patent
Celli et al.

(10) Patent No.: US 9,485,151 B2
(45) Date of Patent: Nov. 1, 2016

(54) CENTRALIZED SYSTEM MANAGEMENT ON ENDPOINTS OF A DISTRIBUTED DATA PROCESSING SYSTEM

(75) Inventors: Massimiliano Celli, Latina (IT); Gianluca Bernardini, Guidonia (IT); Rosario Gangemi, Lavinio (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2510 days.

(21) Appl. No.: 12/297,081

(22) PCT Filed: Feb. 28, 2007

(86) PCT No.: PCT/EP2007/051893
§ 371 (c)(1),
(2), (4) Date: Oct. 14, 2008

(87) PCT Pub. No.: WO2007/122030
PCT Pub. Date: Nov. 1, 2007

(65) Prior Publication Data
US 2009/0164201 A1    Jun. 25, 2009

(30) Foreign Application Priority Data
Apr. 20, 2006  (EP) ..................................... 06112790

(51) Int. Cl.
*G06F 9/45* (2006.01)
*H04L 12/24* (2006.01)
(Continued)

(52) U.S. Cl.
CPC .................. *H04L 41/20* (2013.01); *G06F 8/61* (2013.01); *H04L 29/08981* (2013.01)

(58) Field of Classification Search
USPC ........................................................ 717/172
See application file for complete search history.

(56) References Cited

U.S. PATENT DOCUMENTS

5,845,090 A * 12/1998 Collins et al. ................ 709/221
5,903,896 A 5/1999 Waldman et al.
6,113,652 A 9/2000 Lysik et al.
(Continued)

*Primary Examiner* — Matthew Brophy
(74) *Attorney, Agent, or Firm* — Yee & Associates, P.C.; Gail H. Zarick (57) ABSTRACT

A method is described for performing system management operations on at least one target endpoint data processing apparatus of a distributed data processing system including a system management server adapted to the centralized system management of the endpoints of the distributed data processing system. The method comprises: at the system management server, receiving a system management activities plan including at least one system management activity to be performed on the at least one target endpoint; having the system management server executing the system management activities plan, wherein the executing the plan includes performing the at least one system management activity. Prior to executing the corresponding system management activity, having the system management server cause the execution, on the at least one target endpoint, of a simulated system management activity corresponding to and adapted to simulate the at least one system management activity in the plan so as to ascertain a capability of the at least one target endpoint of successfully executing the system management activity on the at least one target endpoint; and having the system management server execute the system management activity conditionally to a result of the execution of the simulated system management activity. Preferably, a selected corrective activity may be performed to remove the cause of the negative result of the simulated system management activity.

8 Claims, 5 Drawing Sheets

(51) Int. Cl.
  *G06F 9/445* (2006.01)
  *H04L 29/08* (2006.01)

(56) References Cited

U.S. PATENT DOCUMENTS

| | | | |
|---|---|---|---|
| 6,536,037 B1 * | 3/2003 | Guheen et al. | 717/151 |
| 6,611,498 B1 | 8/2003 | Baker | |
| 6,651,191 B1 * | 11/2003 | Vacante et al. | 714/47.1 |
| 6,697,960 B1 | 2/2004 | Clark et al. | |
| 6,880,151 B2 * | 4/2005 | Abdelhadi et al. | 717/136 |
| 6,973,647 B2 * | 12/2005 | Crudele et al. | 717/177 |
| 6,990,655 B2 * | 1/2006 | Abdelhadi et al. | 717/120 |
| 7,370,323 B2 * | 5/2008 | Marinelli et al. | 717/173 |
| 7,478,149 B2 | 1/2009 | Joshi et al. | |
| 7,493,326 B2 * | 2/2009 | Bishop et al. | 707/781 |
| 7,549,042 B2 * | 6/2009 | Glaum et al. | 713/100 |
| 7,587,453 B2 * | 9/2009 | Bhrara et al. | 709/204 |
| 7,657,887 B2 * | 2/2010 | Kothandaraman et al. | 717/176 |
| 7,698,699 B2 * | 4/2010 | Rogers et al. | 717/168 |
| 7,886,031 B1 * | 2/2011 | Taylor et al. | 709/221 |
| 2002/0133576 A1 * | 9/2002 | Koymans et al. | 709/221 |
| 2003/0051188 A1 | 3/2003 | Patil | |
| 2003/0061327 A1 * | 3/2003 | Abdelhadi et al. | 709/223 |
| 2003/0132962 A1 * | 7/2003 | Santori et al. | 345/762 |
| 2004/0064436 A1 | 4/2004 | Breslin et al. | |
| 2004/0148599 A1 * | 7/2004 | Kamalanathan et al. | 717/173 |
| 2004/0153708 A1 | 8/2004 | Joshi et al. | |
| 2004/0210889 A1 * | 10/2004 | Childress et al. | 717/168 |
| 2005/0210460 A1 * | 9/2005 | Rogers et al. | 717/168 |
| 2005/0229175 A1 * | 10/2005 | McCrory et al. | 717/177 |
| 2005/0278703 A1 * | 12/2005 | Lo et al. | 717/126 |
| 2006/0009944 A1 | 1/2006 | Shah | |
| 2006/0031371 A1 | 2/2006 | Uthe | |
| 2006/0080656 A1 | 4/2006 | Cain | |
| 2007/0027731 A1 * | 2/2007 | Bishop et al. | 705/7 |
| 2007/0156889 A1 * | 7/2007 | Bhrara et al. | 709/224 |
| 2010/0107015 A1 * | 4/2010 | Bernabeu-Auban et al. | 714/38 |

* cited by examiner

CENTRALIZED SYSTEM MANAGEMENT ON ENDPOINTS OF A DISTRIBUTED DATA PROCESSING SYSTEM

FIELD OF THE INVENTION

The present invention generally relates to the field of electronic data processing and data processing systems. More particularly, the invention relates to distributed data processing systems, or data processing system networks (e.g., computer networks). Specifically, the invention concerns methods for the centralized system management on target apparatuses of a distributed data processing system.

BACKGROUND OF THE INVENTION

System management operations are frequent in modern data processing systems. Typical system management operations may include distributing and installing new software products, removing old or no more used ones, updating older versions of already installed software products to newer releases, distributing and installing patches solving problems to already installed software applications, and so on.

In distributed data processing systems, forming for example the data processing infrastructures of enterprises, state agencies, institutions of the most disparate nature, which may include very large numbers of terminal computers, system management operations on the several different target computers (also referred to as "endpoints") of the network are expediently managed in a centralized way, by technically skilled system administrators.

For this purpose, system management software applications have been created and are commercially available that facilitate the centralized system management of the several endpoints that very often make up a distributed data processing system. For example, such system management applications may be or include software package distribution applications that facilitate the deployment of the desired packages of software products from a central site to one or more (possibly all) of the desired endpoints of the network.

An exemplary system management application is the product commercially known as "IBM Tivoli Configuration Manager" (shortly, ITCM), by IBM Corporation.

An aspect of paramount importance in many distributed data processing systems is guaranteeing "business continuity", which can be defined as ensuring that the data processing system continues to guarantee an at least minimum level of services irrespective the occurrence of critical events.

Guaranteeing business continuity in a distributed data processing system involves in particular ensuring that any software application installed on a certain set of endpoints is maintained at the same release level on all the endpoints of the set; this aspect of business continuity may be referred as "business continuity at the enterprise level". In fact, a situation wherein a subset of endpoints implements a certain release level, and another subset of endpoints implements a different release level of a same application software is not considered secure from the business continuity viewpoint, because the endpoints implementing different release levels may for example encounter problems when communicating with each other.

Also, in performing system management operations in a centralized way, it is important to avoid doing actions that may impair the system business continuity; this kind of business continuity may be referred to as "business continuity at the endpoint level". For example, when a certain release of a software application installed on a certain endpoint needs to be upgraded to a newer release, before performing the upgrade it is necessary to ascertain whether that application is currently being executed on that endpoint: in this latter case, since the installation of the upgrade may likely cause an interruption of the activities being performed by that endpoint (for example, an endpoint restart could be needed to successfully complete the upgrade installation, and/or one or more Dynamic Link Libraries—DLLs—which are currently being used and thus locked may have to be replaced during the installation of the upgrade) the upgrade installation operation is better delayed.

Thus, the requisite of business continuity has a strong impact on how the system management operations are to be performed.

SUMMARY OF THE INVENTION

The Applicant has tackled the problem of improving known centralized system management methods and systems, with the aim of enhancing business continuity.

In particular, the Applicant has observed that known centralized, automated system management applications, like for example the cited ITCM, do not avoid the intervention of the system administrator for resolving particular situations. For example, the ITCM allows managing an activity of installation of a software package including a desired software application in a mode called "transactional", including two steps: a first, "preparation", step, wherein each action involved in the application of the software package prepares the conditions for the successful execution of the requested operation; for example, in the case of an installation of software, the relevant files are installed in a staging area of the endpoint; and a second, "commits" step, in which the application of the software package takes effect and, for example, the files are moved from the staging area to the production area. The commit step is performed only on condition that the preparation step completes successfully. If, for any reason, the preparation step cannot complete successfully on all the specified target endpoints, a problem arises that the system administrator has to personally take care of, in order to ensure business continuity at the enterprise level. In particular, the system administrator may have to iterate once or more the transactional mode installation of the software package on the subset of endpoints where the problems originated.

Problems also arises as far as the business continuity at the single endpoint level is considered; in this respect, the system administrator may directly install the software package on the specified endpoints, but even in this case it is not possible to guarantee that the installation will succeed on all the targets. For example, in case an older version of the application to be upgraded is running on an endpoint, and a DLL is locked, the direct installation of the upgraded version may modify the environment before aborting when it tries to modify or replace the locked DLL; however, the modified environment may not be suitable for the execution of the previous software application version, and rolling the system configuration back to a consistent level may be hard.

According to an aspect of the present invention, a method as set forth in appended claim 1 is provided, for performing system management operations on at least one target endpoint data processing apparatus of a distributed data processing system including a system management server adapted to the centralized system management of the endpoints of the distributed data processing system. The method comprises:

at the system management server, receiving a system management activities plan including at least one system management activity to be performed on said at least one target endpoint;

having the system management server executing the system management activities plan, wherein said executing the plan includes performing the at least one system management activity.

Prior to executing the corresponding system management activity, the system management server automatically causes the execution, on the at least one target endpoint, of a simulated system management activity corresponding to and adapted to simulate the at least one system management activity in the plan so as to ascertain a capability of the at least one target endpoint of successfully executing the system management activity.

The system management server then executes the system management activity conditionally to a result of the execution of the simulated system management activity.

Preferably, in case the execution of the simulated system management activity provides a negative result indicating that corresponding system management activity cannot be successfully executed on the at least one target endpoint, the system management server:

determines a cause of the negative result of the simulated system management activity;

based on the determined cause, selects a corrective activity among a set of possible correcting activities, and performs the selected corrective activity to remove the cause of the negative result of the simulated system management activity.

According to another aspect of the present invention, a data processing system as set forth in appended claim 7 is provided.

According to still another aspect of the present invention, a computer program as set forth in appended claim 8 is provided.

BRIEF DESCRIPTION OF THE DRAWINGS

The features and advantages of the present invention will be made apparent by the following detailed description of an embodiment thereof, provided merely by way of non-limitative example, description that will be conducted making reference to the attached drawings, wherein.

DETAILED DESCRIPTION OF THE PREFERRED EMBODIMENT(S)

Figure 1:
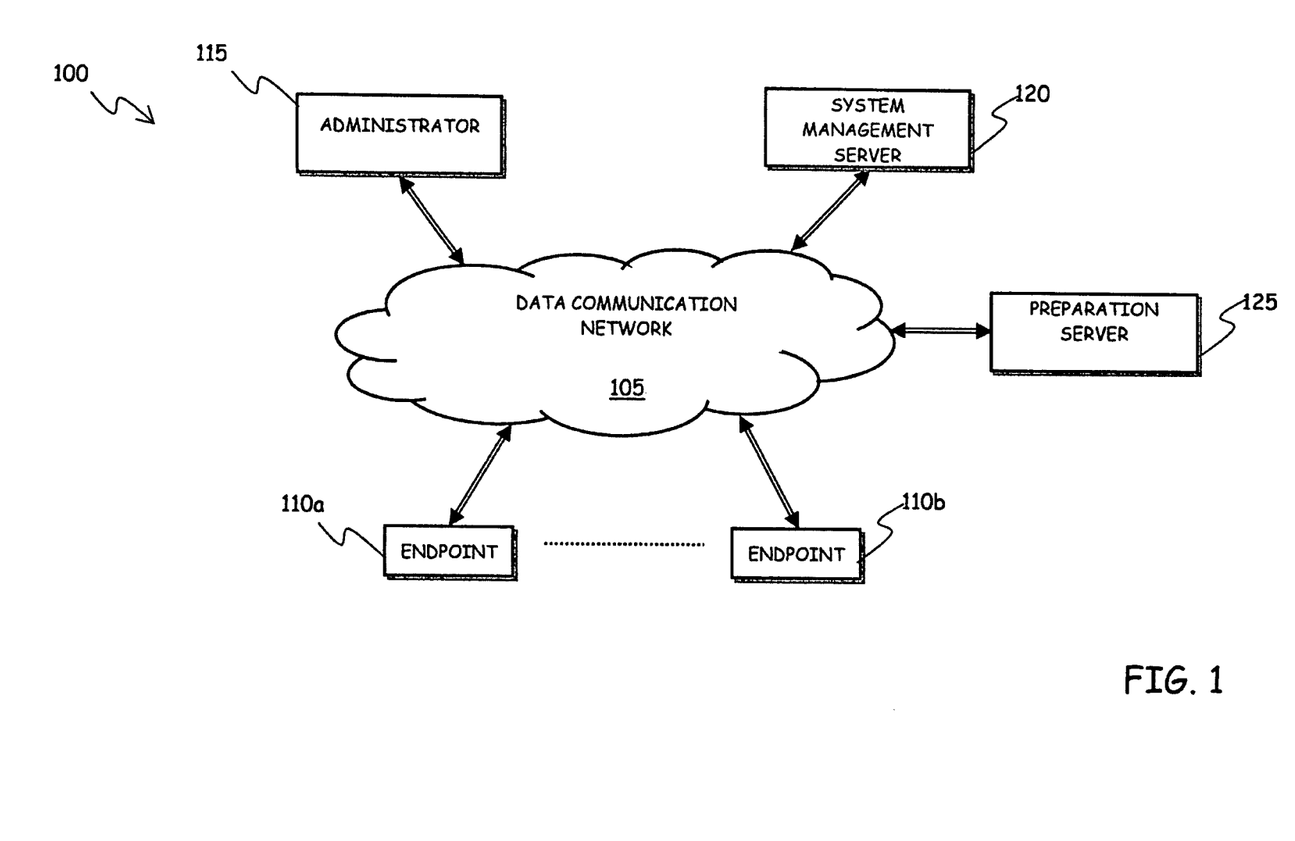
FIG. 1 schematically shows a distributed data processing system wherein an embodiment of the present invention can be applied.

With reference to the drawings, in FIG. 1 there is schematically shown an exemplary distributed data processing system 100, particularly a computer network, in which an embodiment of the present invention can be usefully applied.

The data processing system 100 may for example be the data processing infrastructure of an enterprise, a corporation, a state agency, a university or a research institute, or the like.

The data processing system 100 includes a plurality of data processing apparatuses, like for example computers (Personal Computers—PCs—or workstations), network printers, storage devices, routers, spread across the premises of the owner of the data processing infrastructure, in either a single building or in different, even physically distant buildings, which are interconnected by means of a data communication network 105, which can be or include wired and/or wireless links. For example, the data communication network 105 may be or include an Ethernet network, a WiFi network, a GPRS network, an optical communications network. It is observed that albeit particularly adapted to relatively large computer networks, nothing prevents however that the present invention be applied in relatively small network of computers, like small office environments; thus, the data processing system 100 may as well include a relatively small number of computers.

In the drawing, for the sake of simplicity, only a few of the data processing apparatuses that make up the data processing system 100 are depicted: these include two computers 110a and 110b, assumed to be representative of data processing system endpoints, a computer 115 (hereinafter also referred to as the administrator computer), assumed to be the computer used by a data processing system administrator for administrating the data processing system, a computer 120, assumed to represent a system management server, for the centralized and automated accomplishment of system management operations, and a computer 125, assumed to represent a preparation server, for the preparation of software packages to be deployed.

The data processing system endpoints, like the computers 110a and 110b, are in particular the computers (or other data processing apparatuses) used for performing those activities making up the business of the owner of the data processing infrastructure; in particular, the endpoints 110a and 110b are the computers wherein specific application software products are assumed to be installed and executed, for managing activities related to the specific business. The system administrator, through the computer 115, accesses the data processing system 100 for managing, surveillance and maintenance purposes, in particular for performing system management operations on the endpoints, like modifying the configuration of the endpoints, particularly installing new software products, removing old or no more used ones, updating older versions of already installed software products to newer releases, installing patches solving problems to already installed software applications, performing inventory and/or monitoring operations on the endpoints; for the purposes of the present description, by "inventory" there is meant an operation of getting from an endpoint a respective hardware and/or software profile, whereas the "monitoring" of an endpoint includes monitoring the usage of the resources of the endpoint, like the usage of the CPU, of the storage area, and the like.

The system management server 120 is meant to be a server supporting the execution of a system management software application designed to automating the centralized execution of the system management operations on the endpoints, thereby facilitating the task of the system administrator.

In particular, and merely by way of example, the system management server 120 supports the execution of the ITCM product referred to in the foregoing.

Without entering into excessive details, known per-se and not relevant for the understanding of the invention embodiment herein described, the ITCM allows the system administrator creating plans, i.e. lists of activities for performing system management operations, like changing the configuration of one or more of the endpoints, particularly distributing software packages directed to the installation or removal or upgrading of software applications on the endpoints of the data processing system 100, or for performing other system management operations like inventory and/or monitoring operations on the endpoints. The configuration management activities plans, created for example by the system administrator, are then submitted for execution to the system management server 120, which executes, in automated way and substantially without the intervention of the system administrator, the various activities in the plans, as will be described in greater detail subsequently.

The preparation server 125 operates as a central site for defining and testing software packages to be used for deploying software products, such as application programs, and it also acts as a source host providing the required software packages during a deployment process for deploying the software packages to selected endpoints, actuated by a deployment service, like for example the "Multiplexed Distribution", ("MDIST2) service based on the "Tivoli Management Framework" ("TMF") by IBM Corporation, coordinated by the system management server 120.

Figure 2:
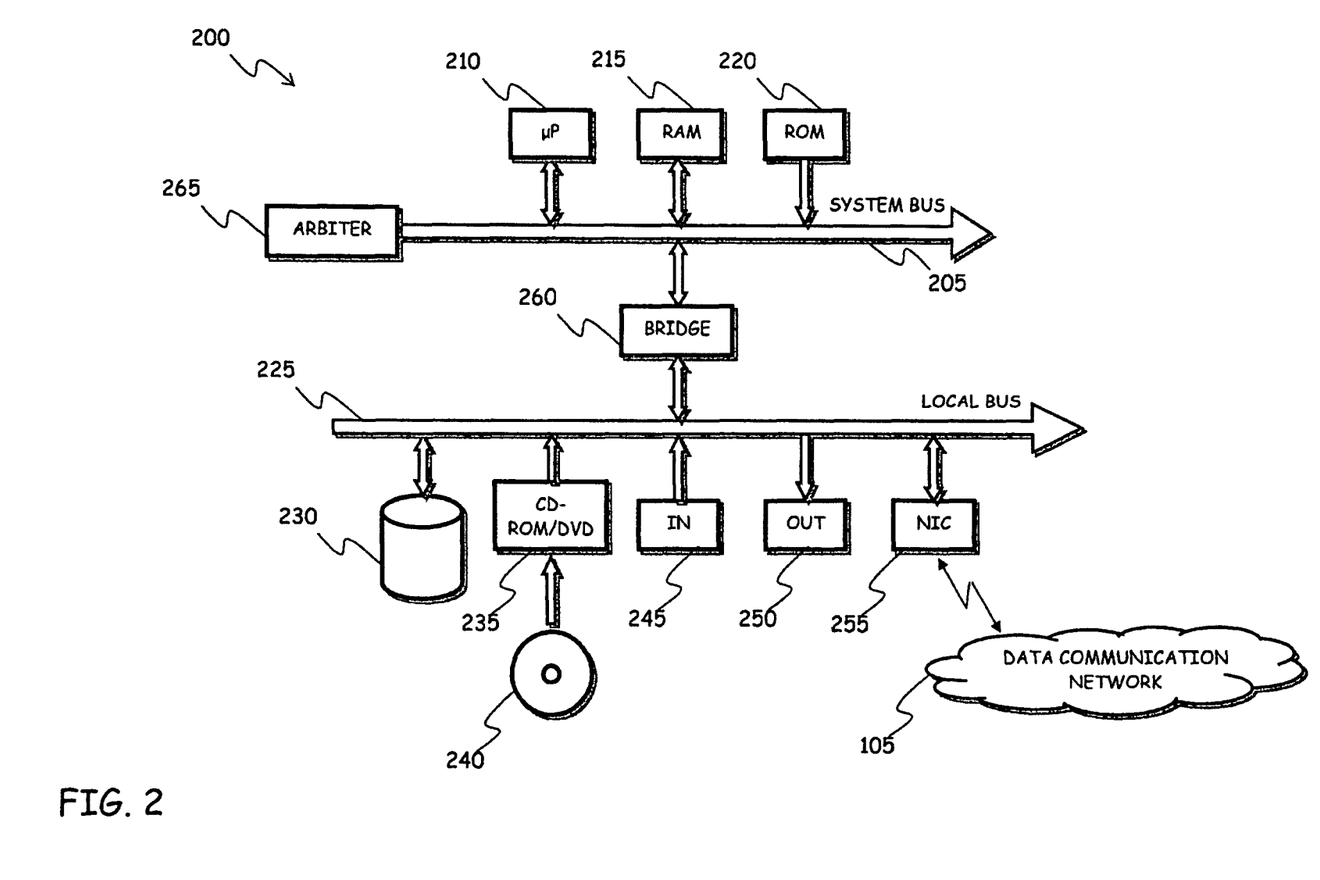
FIG. 2 schematically shows, in terms of functional blocks, the internal structure of a generic computer of the data processing system of FIG. 1.

As shown in FIG. 2, a generic computer of the data processing system 100, such as any of the endpoints 110a, 110b, the administrator computer 115, the system management server 120, the preparation server 125, is comprised of several interconnected units, denoted globally 200. In particular, some of the units are connected in parallel to a system bus 205. In detail, one or more microprocessors (μP) 210 control the operation of the computer 200; a RAM 215 is directly used as a working memory by the microprocessors 200, and a ROM 215 stores the basic code for a bootstrap of the computer 200. Peripheral units are connected (by means of respective interfaces) to a local bus 225. Particularly, mass storage devices comprise a hard disk 230 and a CD-ROM/DVD-ROM drive 235 for reading CD-ROMs/DVD-ROMs 240. Moreover, the computer 200 typically includes input devices 245, for example a keyboard and a mouse, and output devices 250, such as a display device (monitor) and a printer. A Network Interface Card (NIC) 255 is used to connect the computer 200 to the network 105. A bridge unit 260 interfaces the system bus 205 with the local bus 225. Each microprocessor 210 and the bridge unit 260 can operate as master agents requesting an access to the system bus 205 for transmitting information; an arbiter 265 manages the granting of the access to the system bus 205.

Figure 3:
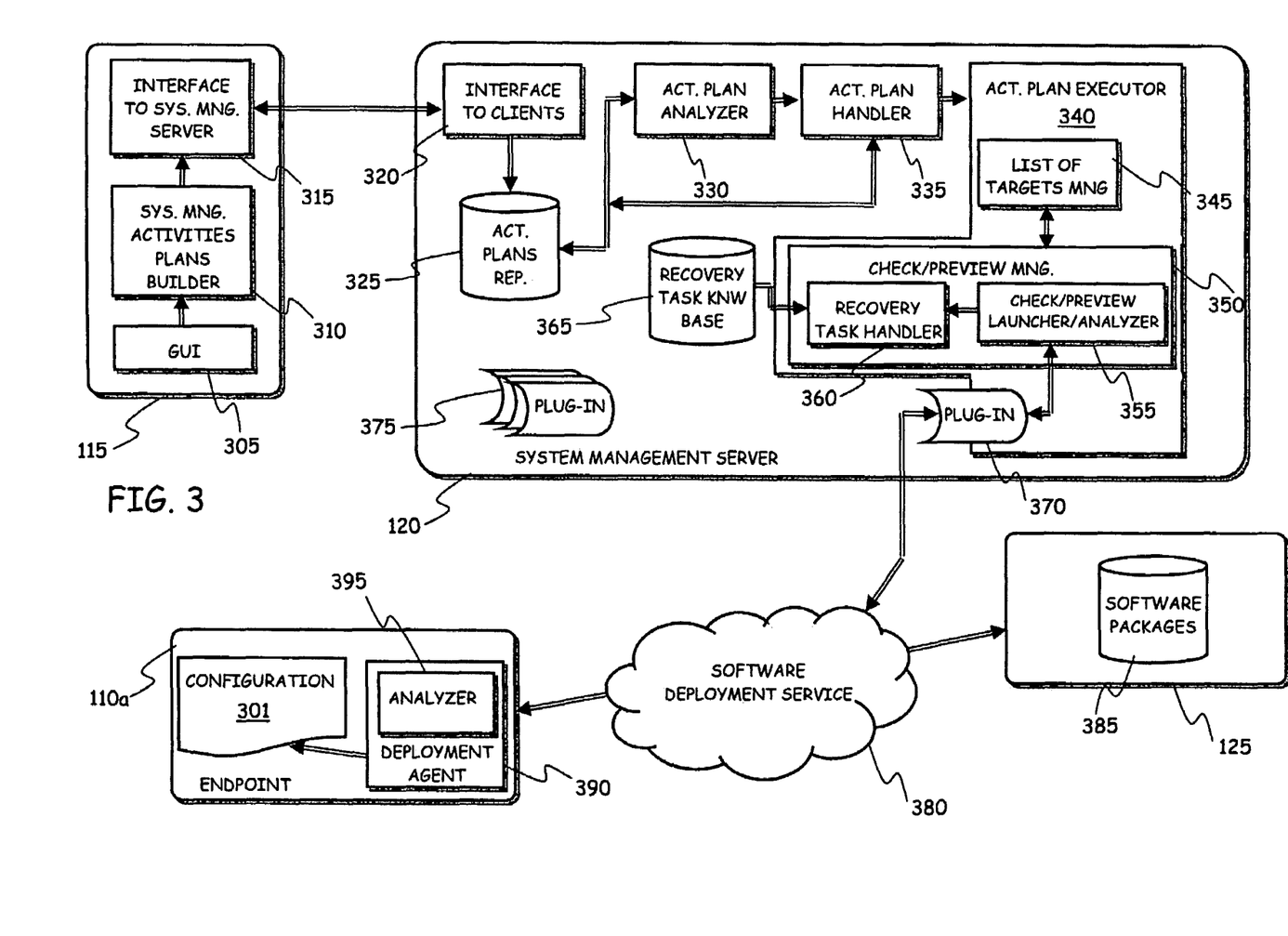
FIG. 3 schematically depicts, in terms of functional blocks, the main components, including software components, that implement the invention embodiment being described.

FIG. 3 schematically depicts, in terms of functional blocks, the main components (including software components) implementing the invention embodiment herein described. Any of the functional blocks depicted in FIG. 3 may either represent one or more software modules, one or more hardware resources, or a mix of software and hardware resources. Programs and data are typically stored on the hard disk of the computers and are (at least partially) loaded into the computer working memory when the programs are executed (in the drawing, an operating system as well as other basic application programs concurrently running on a generic computer are not shown, for the sake of clarity).

In the computer 115 of the system administrator, a Graphical User Interface (GUI) 305 is typically (albeit not limitatively: the system administrator may also exploit a command line interface) provided. Through the GUI 305, the system administrator interacts with a system management activities plans builder 310; the system management activities plans builder 310 allows the system administrator creating plans of system management activities to be then submitted to the system management server 320 for the automated execution of system management operations on the endpoints; system management operations as herein used are to be construed broadly as including any operation that may be directed to get knowledge of, and/or possibly modify the configuration of generic endpoints; examples of system management operations may include installing new software products or new releases of software products on specified endpoints, or uninstalling old software products, installing patches solving bugs or deficiencies, monitoring the performance of the endpoints, such for example the usage of resources like for example hard disk space, working memory area, CPU, and the like, inspecting the hardware and/or software profile of an endpoint. In the drawing, a block denoted 301 has been used to schematize the configuration of the generic endpoint 110a, and is intended to represent anything that, in the endpoint, may be subject to a system management operation. A system management activities plan includes one or more system management activities; the execution of the generic system management activity in the plan may be conditioned to the execution of one or more other activities in the plan.

For example, in the case of the distribution of software packages, the generic activity in the plan may be specified by a target state of the software package to be distributed, like installed and committed, installed in undoable manner, removed, and so on.

The plans may be built based on reference models; for example, in the case of software package distribution, each reference model specifies the target state of one or more selected software packages on the endpoints subscribing to it (identified by a role that is defined, for example, by a category of users, by a department, or by specific features). Once known the current configuration of the endpoints in the system (through a corresponding database, not shown in the figure), the activities plans builder 310 can determine the activities to be performed on each endpoint (associated with a selected reference model) for reaching the target state of each relevant software package (for example, installing a software package that is not available, or removing a software package that is not required any longer).

An interface 315 to the system management server 320 allows the interaction of the system administrator computer 115 with the system management server 120 (the communication takes place over the data communications network 105, using specific or typical protocols).

The system management activities plans builder 310 and the interface 315 (plus possible other modules, herein not shown because not relevant to the understanding of the invention embodiment being described) form a client side of a client-server centralized system management software application whose server side lies on the system management server 120.

In the system management server 120, an interface 320 to clients colloquiate with the interface 315 in the computer 115. In particular, through the interfaces 315 and 320 and the data communications network 105, system management activities plans created by the system administrator are uploaded to the system management server 120, and saved in a repository 325 waiting to be executed. The interfaces 315 and 320 may also be exploited in general for enabling communication between the computer 115 of the system administrator and the system management server 120, for example for notifying the system administrator. An activity plan analyzer 330 analyzes the activities plans for formal (e.g., syntax) correctness; the analyzed plans may be stored back in the repository 325, whereas formally incorrect plans may be discarded (preferably after notifying the system administrator). The (syntactically correct) activities plans are managed by an activities plans handler 335, which in particular schedules the execution thereof, based for example on attributes specified by the system administrator, like an execution time, a level of priority, and the like. The activities plans handler 335 passes the activities plans to be executed to an activity plan executor 340.

System management activities plans generally include a list of one or more endpoints being the targets of the system management activities specified in the plan. For example, the list of targets may specify a subset of the data processing system endpoints, including for example the endpoints 110a and 110b, on which the system management activity has to be performed, for example on which a new software application, or a new release of an already installed software application has to be installed, or which are to be monitored, or subjected to an inventory operation. The activity plan executor 340 includes a list of targets manager 345, adapted to manage the list of targets specified in the activities plan being executed and capable of directing the execution of the specified system management activities to the proper endpoints.

According to an embodiment of the present invention, the activity plan executor 340 also includes a system management operation check/preview manager 350, adapted to cause the execution, on the selected targets and in respect of specific system management activities, and particularly in respect of default system management activities or activities expressly indicated by the system administrator, of a preliminary simulated activity, like a check/preview of the real system management activity, before actually performing the specified system management activity, in order to get knowledge of whether the specified system management activity can actually be performed with reasonable chances of success on the specified targets.

In particular, in an embodiment of the present invention, the system management operation check/preview manager 350 includes a check/preview activity launcher/analyzer 355, adapted to automatically generate a new activity in respect of specified system management activities, wherein said new activity is adapted to cause the execution of a simulation of the corresponding, specified system management activity on the specified targets (as described in the list of targets), and to analyze the results of the activity simulation conducted by the different target endpoints and retrieved therefrom. Based on the simulation results, the system management operation check/preview manager 350 is capable of determining whether the specified system management activity, when actually executed on the specified targets, will give a successful result, or whether instead on one or more of the specified targets that activity will not be executed successfully. The system management operation check/preview manager 350 is adapted to interact with the list of targets manager 345, in order to modify/redefine the list of targets according to the results of the preliminary check/preview phase.

In order to perform the required simulation, functionalities already resident on the target endpoints may be exploited, or suitably-designed agents may be installed thereon; for example, in the case of software package distribution, an agent resident on the endpoint may be exploited, adapted to perform an introspection of the software package and to determine in advance the actions that should be executed on the endpoint for installing the corresponding software application, based for example on runtime information, e.g. selections entered by the users of the endpoints, or derived from the hardware/software configurations of the endpoints (such as their CPU model, the RAM size, the operating system installed, the available hard-disk space, or the availability of another software product). In FIG. 3, such an agent has been schematized by a block 395 called "analyzer".

In a preferred embodiment of the present invention, the system management operation check/preview manager 350 further includes a recovery task handler 360. The recovery task handler 360 is adapted to automatically managing (at least some of) error conditions encountered in the specified targets while performing the preliminary check/preview, i.e. error conditions encountered by the target endpoints while performing the simulation of a certain system management activity. In particular, the recovery task handler 360 is adapted to get from the check/preview activity launcher/analyzer 355 an indication of the type of error conditions encountered by specific endpoints in the list of targets, while simulating the specified system management activity. Based on said error type indication, the recovery task handler 360 is adapted to conduct a search in a knowledge base 365 of recovery tasks, wherein each recovery task specified in the knowledge base 365 is adapted to manage one or more specific error conditions so as to remove the cause of the error. The recovery task handler 360 may in particular be adapted to identify, in the knowledge base 365, the proper recovery task or tasks, and to manage its/their execution on the proper endpoints, so as to (at least try to) automatically remove the cause(s) that produced the error in the preliminary check/preview activity.

For example, assuming that an activity specified in the activities plan being executed involves the installation of a certain software application on a selected set of endpoints, the preliminary preview/check activity may be adapted to return, as error conditions encountered in or in respect of one or more of the endpoints in the selected set:

a) a low disk space;
b) an unavailability of the target endpoint; for example, the specified endpoint may not be reachable by the system management server 120 (e.g., the endpoint may be momentarily turned off or in standby, or the endpoint may be disconnected from the data communications network—e.g. in the case of nomadic data processing apparatuses—or an agent resident on the endpoint and necessary for performing the specified system management activity may fail to start or crash);
c) a failure of a check for an ex-requisite;
d) the fact that an already installed version of the software product is at the moment running on the target endpoint;
e) a temporary failure of the data communications network;
f) an unavailability of a service necessary at the selected endpoint for performing the requested system management activity (for example, when it is desired to install a WebSphere application, the application server service needs to be running, or in case it is necessary to run an SQL script, it is necessary to have a DB2 service running).

In case a), a possible recovery task may involve installing, on the specified endpoint(s), a predetermined cleanup software package, adapted to cleanup the file system and to free disk space; in case b), a recovery task may involve activating a "wake-on-LAN" feature on the software deployment service (a feature adapted to allow the endpoint to be woken-up remotely, via the connection over the data communications network, triggering a boot of the powered-off endpoint); in case c), the recovery task may consist in removing the conflicting software from the endpoint(s); in cases d) and e), it may be possible to reschedule the software distribution activity for that endpoint(s); in case f), a recovery task may be executed to restart the service.

Thus, a recovery task for a generic error condition encountered when performing the preliminary check/preview operation in respect of a certain system management activity may simply consist in rescheduling the corresponding system management activity (and of the preliminary check/preview) at a later time, or in a real (active) recovery action selected from the knowledge base of predefined actions adapted to deal with known error conditions.

In order to perform the activities specified in the activities plan under execution, the activity plan executor 340 may exploit one or more plug-ins 370, properly selected from a plug-in collection 375. For example, in case the system management activities listed in the activities plan under execution include the distribution of a software package to a specified set of endpoints, the plug-in 370 may be adapted to interact with a software deployment service 380, like for example the already-cited ITCM by IBM Corporation, which is designed to cause selected software packages, stored for example in a repository 385 in the preparation server 125, to be deployed, i.e. distributed and installed on targets, like the endpoint 110a, wherein a deployment agent 390 is for that purpose running.

According to an embodiment of the present invention, the same plug-ins are exploited by the check/preview activity launcher/analyzer 355 for managing the execution of the simulated system management activities on the target endpoints.

It is observed that in the schematic structure of the system management software application depicted in FIG. 3 some of the functional blocks correspond in general terms to the structure of the "Activity Planner Manager" ("APM") of the already mentioned ITCM; however, it is pointed out that the present invention is not to be construed as limited to the application to the ITCM, being instead susceptible of being applied in any system capable of executing activities plans or workflows.

Hereinafter, two exemplary embodiments of a method according to the present invention will be described in detail, making reference to the flowcharts of FIGS. 4 and 5.

Figure 4:
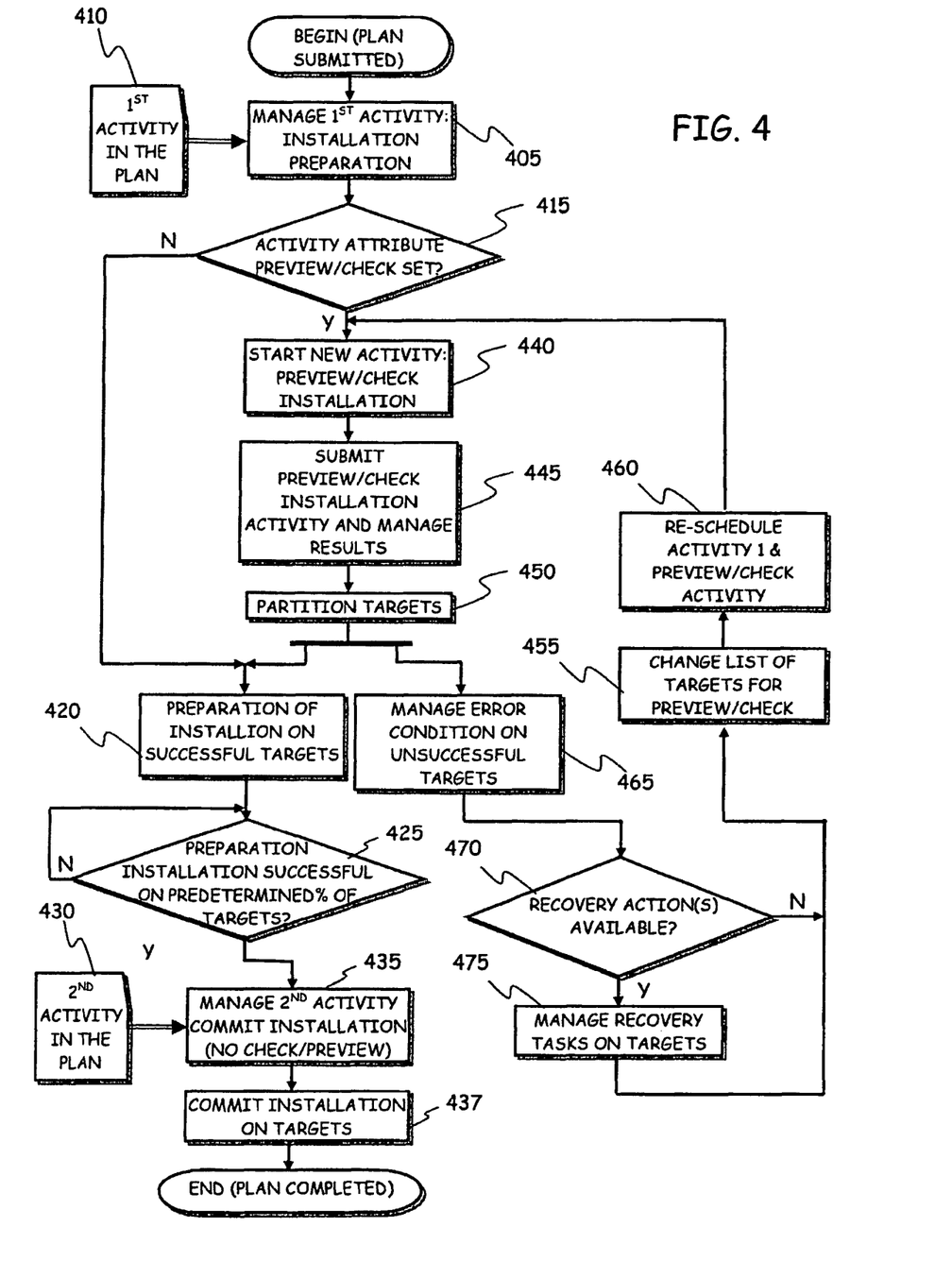
FIG. 4 is a schematic and simplified flowchart depicting the main actions contemplated in a method according to a first embodiment of the present invention.

Referring first to FIG. 4, the flowchart relates to an exemplary case of an activities plan for the installation of a generic software application on a subset of endpoints in "transactional" mode, as allowed by the ITCM, which includes a "preparation" step, wherein each action involved in the application of the software package prepares the conditions for the successful execution of the requested operation, and a "commit" step, performed only on condition that the preparation step completes successfully, in which the application of the software package takes effect and, for example, the files are from a staging area to the production area of the endpoint.

The beginning of the process is assumed to coincide with the submission of the activities plan to the activity plan executor 340. The execution of the activities plan begins with the management of the first activity in the plan (block 405); the first activity in the present example is the preparation step of the software application installation (the first activity is schematized as 410). Before starting to actually execute the activity 410, the system management operation check/preview manager 350 ascertains whether, in the activities plan, the activity under consideration has an attribute indicating that a preview/check step has to be conducted prior to actually performing the activity (decision block 415). The attribute indicating the necessity of performing the check/preview step may have been set by the system administrator while preparing the activities plan, or the activity may fall in a list of predefined activities that, by default, are to be preceded by a preview/check step; alternatively, all the activities, or a class of activities may by default be preceded by a preview/check step, and it may be possible for the system administrator to indicate, in an activities plan, that specific activities are not to be preceded by a preview/check step.

If it is ascertained that the installation preparation activity does not have to be preceded by a preview/check step (exit branch N of decision block 415), the conventional flow is followed: the activity plan executor 340 causes the first activity in the plan to be executed, and the installation of the software application is prepared on the specified target endpoints (block 420); to this purposes, selected plug-ins are chosen from the plug-in collection, that the activity plan executor 340 uses to interact with, e.g., the software deployment service 380. When it is ascertained that the preparation of the installation has been completed successfully on all of the specified target endpoints, or at least on a predetermined percentage thereof, like 90% (decision block 425, exit branch Y), the activity plan executor 340 manages the second activity in the plan (schematized as 430), which in the present example is the commit of the installation (block 435), for which no check/preview operation has been indicated. The commit installation activity is executed (block 437), and the activities plan is completed and the process ends.

Back to decision block 415, if the system management operation check/preview manager 350 ascertains that the first activity in the plan, i.e. the installation preparation has to be preceded by a preview/check phase (exit branch Y of decision block 415), the system management operation check/preview manager 350 automatically creates and starts a new activity (block 440), directed to cause the execution of a simulation on the selected target endpoints for previewing/checking the potential outcome of the installation preparation operation, so as to establish on which of the specified target endpoints the preparation of the software application installation will reasonably succeed, and on which it instead most probably will fail.

The simulation preview/check activity is then submitted for execution to the target endpoints; there, the analyzers 395 are capable of performing an introspection of the software package to be applied, and to determine in advance the actions that should be executed on the endpoint for installing the corresponding software application, based for example on run-time information, for example on selections entered by the users of the endpoints, or on hardware/software configurations of the endpoints (such as their CPU model, the RAM size, the operating system installed, the available hard-disk space, or the availability of another software product).

For example, the analyzers 395 may inspect whether an older version of the software application is running at the moment on a target endpoint, or a minimum amount of free hard disk space is not available, or the endpoint is not available The analyzers 395 report to the check/preview activity launcher/analyzer 355 the results of the simulation, and the reported results are managed (block 445). It is observed that performing the preview/check activity involves simulating, on the specified target endpoints, the operations that would be performed when executing the real activity; in the present example, the real activity is the preparation of the installation of the software application on the specified target endpoints: the corresponding preview/check activity involves simulating, on the target endpoints, the operations that would be performed in the preparation of the software application installation. Simulating a real system management activity means performing a new action on the selected target endpoints, evaluating the real conditions and environment at the time of the operation execution; the simulation operation is adapted to verify all (and only) the actions that, should the real system activity be actually performed, would be executed on each target endpoint (e.g., by a resident agent) (in the example considered, analyzing any action involved in the deployment and installation of the software application on the selected target endpoints); the result is a feedback about the capability of the selected endpoint(s) to actually perform that operations.

A negative result of the preview/check activity may also be the consequence of the fact that the target endpoint is not available/reachable, because turned off or in standby or disconnected from the network, or that a necessary software application (e.g. the deployment agent 390, is not running, or the network is down).

Based on the results of the preview/check activity, the set of target endpoints is partitioned into two subsets (block 450): a first subset including the target endpoints which, as confirmed by the preview/check activity, will be reasonably able to successfully perform the preparation of the software application installation, and a second subset including the target endpoints in respect of which the simulated preparation of the software application installation failed. In respect of the endpoints of the first subset, the software application installation preparation is really performed (block 420); for the endpoints of the second subset, the preparation of the software application installation is rescheduled, together with the respective preview/check activity on a modified list of target endpoints (blocks 455 and 460). It is pointed out that the capability of splitting a set of target endpoints is already available on current versions of the ITCM, exploiting the feature referred as "Multistart Distribution", so from this point of view, no changes are needed.

In a preferred embodiment of the present invention, in addition to rescheduling the activity (and the associated preview/check activity), an attempt is made of automatically managing the errors originated during the simulation of the activity, with the aim of removing, whenever possible, the cause of the error. In particular, the errors, failures encountered during the activity simulation, arranged by target endpoint, are considered (block 465), and the recovery task handler 360 identifies the nature, the type of error/failure, and looks through the knowledge base 365 to ascertain whether there are predefined tasks that can be taken to recover the error/failure (decision block 470). If no such predefined recovery tasks are available in the knowledge base 365 (exit branch N of decision block 470), no recovery operation is performed, and the preparation of the software application installation is simply rescheduled, together with the respective preview/check activity on a modified list of target endpoints (blocks 455 and 460). If instead one or more predefined recovery tasks are found in the knowledge base 365 that match the error/failure condition (exit branch Y of decision block 470), recovery activities are performed to try and remove the cause of the error/failure, at least on one or some of the target endpoints (block 475). Then, the preparation of the software application installation is rescheduled, together with the respective preview/check activity on a modified list of target endpoints (blocks 455 and 460). Preferably, the preparation of the software application installation, together with the respective preview/check activity is rescheduled also in respect of those endpoints for which a recovery activity has been performed, to ensure the recovery action effectively removed the cause of the error or failure.

Figure 5:
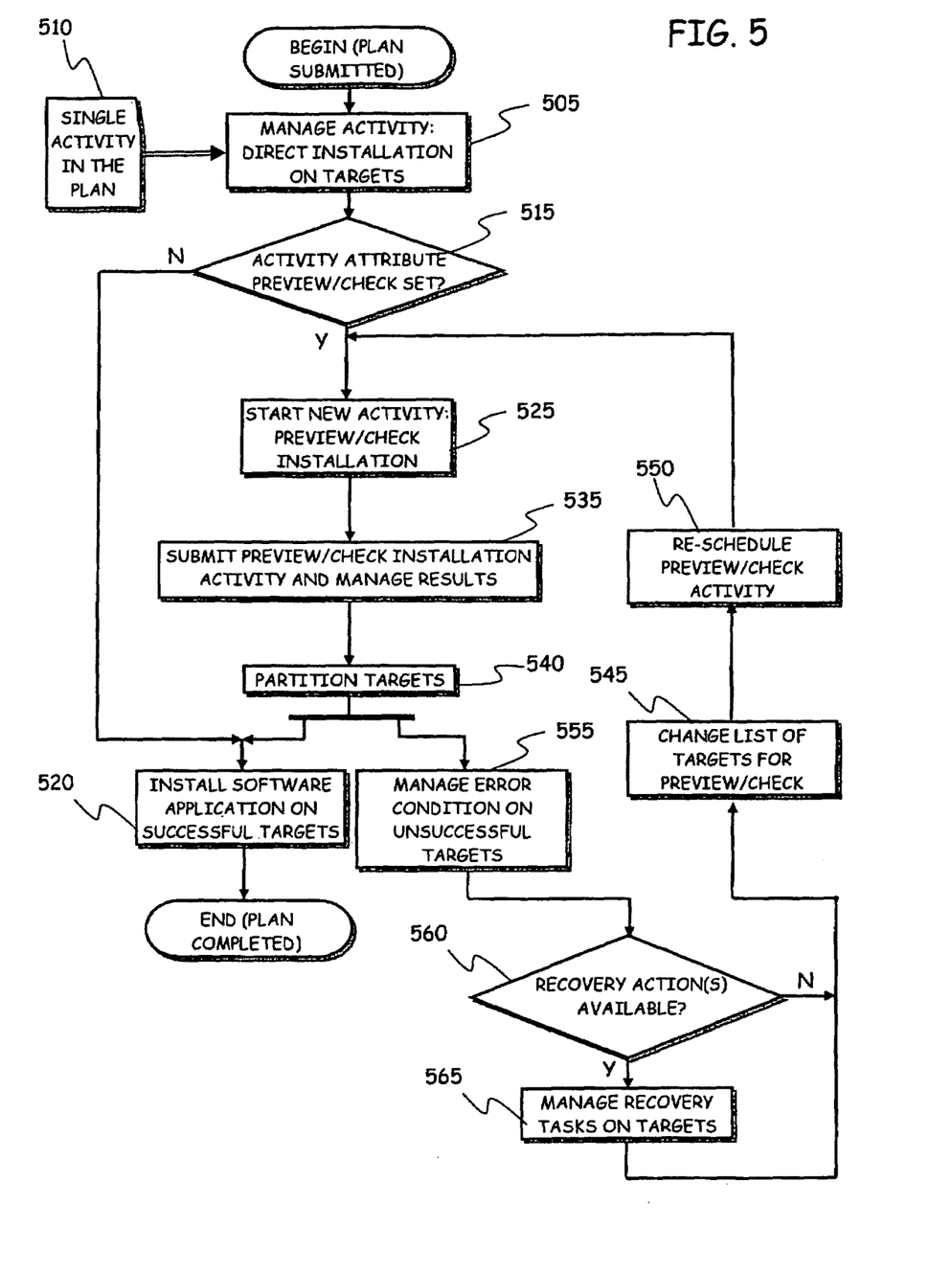
FIG. 5 is a schematic and simplified flowchart depicting the main actions contemplated in a method according to a second embodiment of the present invention.

The example shown in the flowchart of FIG. 5 is somehow simpler, because it refers to an activities plan including only one activity, like for example the direct installation of a software application on a selected set of target endpoints.

As in the previous case, the beginning of the process is assumed to coincide with the submission of the activities plan to the activity plan executor 340. The execution of the activities plan begins with the management of the single activity in the plan (block 505), which in the present example is the direct installation of the software application on the selected target endpoints (the activity is schematized as 510).

Before starting to execute the activity 510, the system management operation check/preview manager 350 ascertains whether, in the plan, the activity has an attribute indicating that a preview/check step has to be conducted prior to actually performing the activity (decision block 515).

If it is ascertained that the installation preparation activity does not have to be preceded by a preview/check step (exit branch N of decision block 515), the conventional flow is followed: the activity plan executor 340 causes the activity in the plan to be executed, and the software application be installed on the specified target endpoints (block 520); to this purposes, selected plug-ins are chosen from the plug-in collection, that the activity plan executor 340 uses to interact with, e.g., the software deployment service 380. The activities plan is completed and the process ends.

Back to decision block 515, if the system management operation check/preview manager 350 ascertains that the activity in the plan, i.e. the software installation has to be preceded by a preview/check phase (exit branch Y of decision block 515), the system management operation check/preview manager 350 starts a new activity (block 525), directed to perform a preview/check to establish on which of the specified target endpoints the installation of the software application will reasonably succeed, and on which it instead most probably will fail.

The preview/check activity is then submitted for execution, and the results are managed (block 535). As before, performing the preview/check activity involves simulating, on the target endpoints, the operations that would be performed when executing the real activity, which, in the present example, is the installation of the software application on the specified target endpoints: the corresponding preview/check activity involves simulating, on the target endpoints, the operations that would be performed in the software application installation, so as to ascertain the capability of the endpoints of processing a direct software installation.

Based on the results of the preview/check activity, the set of target endpoints is partitioned into two subsets (block 540): a first subset including the target endpoints which, as confirmed by the preview/check activity, will reasonably support the software application installation, and a second subset including the target endpoints in respect of which the simulation indicated them as unable to handle the software application installation (for example, because an older version of the application is in that moment in use, or because the target endpoint is unavailable, or there is not sufficient free space on the hard disk). In respect of the endpoints of the first subset, the real software application installation is performed (block 520); for the endpoints of the second subset, the installation of the software application is rescheduled, together with the respective preview/check activity on a modified list of target endpoints (blocks 545 and 550).

In a preferred embodiment of the present invention, in addition to rescheduling the activity (and the associated preview/check activity), an attempt is made of managing the errors originated during the simulation of the activity, with the aim of removing, whenever possible, the cause of the error. In particular, the errors, failures encountered during the activity simulation, deduced by the reports received from the endpoints, are arranged by target endpoint, and are considered (block 555); the recovery task handler 360 identifies the nature, the type of error/failure, and looks through the knowledge base 365 to ascertain whether there are predefined tasks that can be taken to recover the error/failure (decision block 560). If no such predefined recovery tasks are available in the knowledge base 365 (exit branch N of decision block 560), no recovery operation is performed, and the preparation of the software application installation is rescheduled, together with the respective preview/check activity on a modified list of target endpoints (blocks 545 and 550). If instead one or more predefined recovery tasks are found in the knowledge base 365 that match the error/failure condition (exit branch Y of decision block 560), recovery activities are performed to try and remove the cause of the error/failure, at least on one or some of the target endpoints (block 565). Then, the preparation of the software application installation is rescheduled, together with the respective preview/check activity on a modified list of target endpoints (blocks 455 and 460). Also in this case, the software application installation, together with the respective preview/check activity is preferably rescheduled also in respect of those endpoints for which a recovery activity has been performed, to ensure the recovery action effectively removed the cause of the error or failure.

In other words, the method according to the present invention provides for automatically setting up and launching, in respect of a system management activity, a corresponding simulation activity, involving simulation or checks to be performed on specified target endpoints; such simulation can be performed before performing any respective system management activity of a system management activities plan, and is directed to check/preview the results of that activity being really performed on the specified target endpoints. Since a generic system management activity is basically the description of an operation that one or more component(s) of the system management software application is able to run (like for example in the case of a software package deployment operation), the simulation activity can be the description of a simulated operation that the same component(s) has (have) to be able to run. For example, in the case of the ITCM and of the software package distribution operation, the component(s) of the ITCM responsible of the software package distribution need(s) to be able to simulate the software package distribution, i.e. capable of analyzing, for each of the specified targets endpoints, any action contained in the software package to be distributed; the result of the simulation is a feedback on the capability of each endpoint in the list of targets to actually execute the given operation. In the case of ITCM, the check/preview step may be managed by a hidden activity created for the purpose, and that, under the covers, leverages a dry-run mechanism thought for the Tivoli Software Distribution, against the same subscribers defined for the original activity. The software package to be deployed is distributed to the target endpoints and executed in a simulated way, e.g. in "analysis" mode, whereby the deployment agent 390 resident on the target endpoints, particularly the analyzer 395 runs silently, avoiding to actually perform the actions specified in the software package, only to understand whether the endpoint is capable to actually execute those actions.

Eventually, the original activity is automatically conditioned by target on that hidden one.

By partitioning the initial set of target endpoints into two subsets, including endpoints for which the simulation activity provided successful results and those for which instead the simulation failed, and recursively repeating the simulation until the second subset is empty, it can be guaranteed that in many cases the desired system management operations are performed on the original set of target endpoints (for example, the endpoints are configured as desired), completely automatically, without intervention by the system administrator. This is in particular true in case attempt to automatically recover failure conditions is performed, exploiting predefined recovery tasks.

The implementation of the present invention has been described making reference to an exemplary embodiment thereof, however those skilled in the art will be able to envisage modifications to the described embodiment, as well as to devise different embodiments, without however departing from the scope of the invention as defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD). Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method for performing system management operations on at least one target endpoint data processing apparatus of a distributed data processing system including a system management server adapted to the centralized system management of the endpoints of the distributed data processing system, the method comprising:
- at the system management server, receiving a system management activities plan including at least one system management activity to be performed on said at least one target endpoint;
- having the system management server executing the system management activities plan, wherein said executing the plan includes performing the at least one system management activity, wherein performing the system management activity further comprises:
- prior to executing the corresponding system management activity, having the system management server cause the execution, on the at least one target endpoint, of a simulated system management activity corresponding to and adapted to simulate the at least one system management activity in the plan so as to ascertain a capability of the at least one target endpoint of successfully executing the system management activity; and
- having the system management server execute the system management activity conditionally to a result of the execution of the simulated system management activity.

2. The method of claim 1, further comprising:
- in case the execution of the simulated system management activity provides a negative result indicating that corresponding system management activity cannot be successfully executed on the at least one target endpoint, having the system management server:
- determining a cause of the negative result of the simulated system management activity;
- based on the determined cause, selecting a corrective activity among a set of possible correcting activities and
- performing the selected corrective activity to remove the cause of the negative result of the simulated system management activity.

3. The method of claim 1, wherein said system management activity is selected from the group consisting of: modifying a configuration of the at least one target endpoint; inspecting a configuration of the at least one target endpoint.

4. The method of claim 3, wherein said modifying a configuration of the at least one target endpoint is selected from the group consisting of:
- installing a new software application, upgrading an already installed software application, installing a patch for solving problems of an already installed software application, removing an installed software application.

5. The method of claim 3, wherein said inspecting the configuration of the at least one target endpoint is selected from the group consisting of: monitoring the target endpoint; performing an inventory on the target endpoint.

6. The method of claim 1, wherein said at least one target endpoint includes a plurality of endpoints, and wherein the method further comprises:
- after executing the simulated system management activity on the target endpoints of said plurality, having the system management server:
- partitioning said plurality of target data processing endpoints into a first and a second target data processing endpoints subsets, the first subset containing target endpoints of said plurality on which the execution of the simulated system management activity was successful, and the second subset containing target endpoints of said plurality on which the execution of the simulated system management activity was unsuccessful;
- executing the system management activity on the target endpoints of the first subset; and
- rescheduling the simulated system management activity on the target endpoints of the second subset.

7. A data processing system including processor and memory for performing system management operations on at least one target endpoint data processing apparatus of a distributed data processing system comprising a system management server adapted to the centralized system management of the endpoints of the distributed data processing system; and
- resident in memory at the system management server, a system management activities plan including at least one system management activity to be performed on said at least one target endpoint, wherein the system management server executes the system management activities plan, prior to performing the at least one system management activity, having the system management server cause the execution, on the at least one target endpoint, of a simulated system management activity corresponding to and adapted to simulate the at least one system management activity in the plan so as to ascertain a capability of the at least one target endpoint of successfully executing the system management activity, wherein system management server execution of the system management activity is conditional on a result of the execution of the simulated system management activity.

8. A computer program product comprising a non-transitory computer readable medium with instructions stored thereon for carrying out the steps of a method performing system management operations on at least one target endpoint data processing apparatus of a distributed data processing system when said computer program is executed on a computer, comprising;
- instructions for receiving a system management activities plan including at least one system management activity to be performed on said at least one target endpoint;
- instructions for executing the system management activities plan, wherein said executing the plan includes performing the at least one system management activity,
- instructions for executing on the at least one target endpoint, of a simulated system management activity corresponding to and adapted to simulate the at least one system management activity in the plan so as to ascertain a capability of the at least one target endpoint of successfully executing the system management activity; and
- instructions for executing the system management activity conditionally to a result of the execution of the simulated system management activity.

* * * * *